Patented June 10, 1947

2,421,811

UNITED STATES PATENT OFFICE 2,421,811

PROCESS FOR PRODUCING CHROMAN COMPOUNDS

Lee Irvin Smith and Herbert E. Ungnade, Minneapolis, Minn., assignors to Regents of the University of Minnesota, Minneapolis, Minn., a corporation of Minnesota No Drawing. Application July 14, 1939, Serial No. 284,457

8 Claims. (Cl. 260—333)

This invention relates to new organic chemical compositions and compounds and to methods of producing the same. More particularly the present invention relates to compounds of the coumarane and chromane types, mixtures including such compounds and to methods of producing the compounds and mixtures from available ingredients notably hydroquinone compounds and compounds presenting the conjugated diene structure, or hydroquinone compounds and certain eneols (alcohols).

We have found that when an ingredient including a hydroquinone compound having vacant at least one position ortho to the hydroxyl group is reacted with an ingredient presenting the conjugated diene structure, or with certain mixtures of the latter, that new products are produced which are useful as antioxidants, biological control factors, medicinal agents and for other purposes, and it is an object of the present invention to provide such products and to provide the method of manufacture therefor.

Thus when compounds of the conjugated diene type are reacted with hydroquinone compounds such as hydroquinone derivatives or substituted hydroquinones, for example the hydroquinone monoethers, all having vacant at least one position ortho to the hydroxyl group, chroman or coumaran compounds are produced and it is accordingly an object of the invention to provide such a method of manufacture. The "hydroquinone compound" referred to herein may also be designed as alkyl substituted para-dihydroxybenzenes and their mono ethers and mono esters.

Where the hydroquinone ingredient is a compound of the substituted type, the substitution group or groups may be permitted to remain in place during the reaction with the diene or eneol ingredient, and then, if desired, the substitution group or groups may be cleaved from the resultant product structures, and it is therefore an object of the present invention to provide such methods of producing the new products hereof.

The diene reaction material utilized in our invention may be derived by simple reactions from alcohols and we have made the further discovery that if desired the production of such diene materials may be caused to take place simultaneously in the reaction in which it is used, along with the hydroquinone compound, in the production of the new products of this invention. It is therefore a further object to provide these useful methods for producing the products of this invention.

It is to be understood, of course that under some conditions of operation the hydroquinone compound ingredient may be combined directly with eneol (alcohol) ingredient to produce the desired product without first converting them to the diene type compositions and it is accordingly an object of the present invention to provide such a method of manufacture.

It is a further object of the invention to utilize any exhibited effect of the herein described processes and/or products and to utilize such processes and/or products in any of their known or hereinafter discovered capacities.

Other and further objects are those inherent and implied by the processes and products hereinafter described and claimed.

According to one of the methods of the present invention dienes or compounds presenting the conjugated diene linkage, such as 2,3-dimethyl butadiene-1,3; isoprene or phytadiene may be reacted with hydroquinone compounds such as hydroquinone derivatives, substituted hydroquinones, hydroquinone monoethers or the like, all having vacant at least one position ortho to the hydroxyl group to produce the new products of the present invention. The reaction is preferably carried out in the presence of an acid catalyst which may be an organic acid such as formic acid, or acetic acid; acid chlorides, or anhydrides such as acetyl chloride or acetic anhydride; a substituted organic acid such as halogenated acetic acid, inorganic acids such as sulphuric or phosphoric, or their anhydrides, such as phosphorus pentoxide, or acidic inorganic compounds such as the amine salts, aluminum chloride, zinc chloride, mercuric chloride, phosphorus oxychloride acid sulfates, or boron trifluoride.

This method is illustrated by the following specific examples which are to be considered merely as illustrative and not as limitations upon the invention.

Example I

A mixture of 8.2 grams of dimethylbutadiene, 12.4 grams hydroquinone monomethylether and 1 gram mercuric chloride is reacted by heating first in a water bath and then on a wire gauze until the temperature of the liquid reaches 240° C. Heating is then stopped completely and the reaction mixture is permitted to cool.

The mechanism of the reaction between the hydroquinone monomethylether and the dimethyl butadiene and the structure of the resultant product 2-2-3 trimethyl 6 methoxy chroman are believed to be as follows:

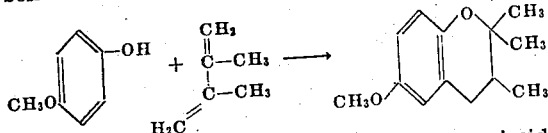

The crude reaction product, which is a viscid brown mass, is then dissolved in ethyl ether and the ether solution washed with Claisen's alkali (potassium hydroxide, methanol and water) and then with water. The ether layer which separates is then dried over calcium chloride and the ether is then distilled off. The residue which remains is a crude dark colored liquid. The crude liquid is then distilled in a high vacuum and yields a water white liquid product having a boiling point of 50–55° C. at $1 \times 10^{-6}$ mm. mercury pressure.

*Example II*

A mixture of 8.2 grams dimethyl butadiene and 12.4 grams hydroquinone monomethylether are dissolved in 10 grams glacial acetic acid. The mixture is saturated with dry hydrogen chloride at 0° C. and then allowed to react by standing in the cold for 18 hours.

The mechanism of this reaction and the structure of the resultant product are believed to be the same as that set forth in Example I. The reaction which is finished by warming in a steam bath, yields a dark oily substance. A solution of 40% KOH is then added while simultaneously cooling. The mixture is then washed with water, separated by the use of ether and purified, as in Example I. The final product is a water white oil. This compound is likewise 2-2-3 trimethyl 6 methoxy chroman.

*Example III*

A mixture of 10 grams trimethylhydroquinone, 100 cc. glacial acetic acid and 1 gram zinc chloride is heated to 100° C. under efficient reflux at atmospheric pressure, and while refluxing 10 grams of isoprene is added. The hot mixture is permitted to stand and is then reacted by further refluxing. One drop of concentrated $H_2SO_4$ is then added and the refluxing continued for one hour.

The mechanism of the reaction between the trimethyl hydroquinone and isoprene and the structure of the resultant product 2-2-5-7-8 pentamethyl 6 hydroxychroman are believed to be as follows:

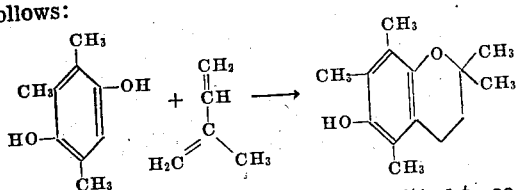

The reaction mixture is then permitted to cool and is then poured into water. A solid which forms is filtered out and recrystallized from dilute ethyl alcohol. The yield is about 7 grams of crystals having a melting point of 94–94.5° C.

*Example IV*

When phytadiene (the diene corresponding to the alcohol, phytol, of chlorophyll) is substituted for the dimethyl butadiene of Example I, a reaction similar to that therein set forth occurs.

Trimethylhydroquinone (0.5 g.) and phytadiene (2 g.) are dissolved in a mixture of formic acid (5 g.) and acetic acid (2 g.) and the solution was refluxed for six hours. The mixture should then be cooled, poured into water, extracted with ether and the ether solution washed with water until the washings are neutral. The ether layer should then be dried over sodium sulphate, filtered and the ether evaporated. The crude product (2 g.) is a dark, viscous oil, which is believed to be alpha tocopherol. The product boils at about 145° under $1 \times 10^{-6}$ mm.

*Example V*

A mixture of 18 grams hydroquinone monomethylether and 11 grams of isoprene in 25 cc. of acetic acid was saturated with dry hydrogen chloride gas at 0° C. The mixture was permitted to stand in the cold (approximately 0° C.) for 12 hours and was then warmed on a steam-bath for 30 minutes, during which the temperature of the mixture gradually approached the temperature of the steam which was 100° C. The mixture was then removed from the steam-bath and permitted to cool to room temperature, at which time an excess of 40% potassium hydroxide was added. The solution was then thoroughly extracted with ethyl ether which served to dissolve the resultant product, and the ether layer was then removed, washed with water, and dried over calcium chloride. The ether solution carrying the product of the reaction was then distilled on a steam-bath at approximately 32° C. and the residual oily product recovered. The resultant oil was fractionally distilled under 0.1 millimeter of mercury pressure and yielded two fractions, the first being recovered between the boiling points of 74° C. and 80° C. and the second between 105° C. and 107° C. The second fraction was apparently an intermediate 1-(o-hydroxy-m-methoxy phenyl)-3 methyl-3-chloro butane and was converted into the composition of the first fraction by cyclization with potassium acetate in methanol.

*Example VI*

A mixture of 2.74 grams trimethylhydroquinone, 1.23 grams pentadiene and 0.3 gram zinc chloride in 30 cc. glacial acetic acid was refluxed for one hour, one drop of concentrated sulphuric acid being added during refluxing. After refluxing the resultant mixture was poured into cold water. Solid material separated out when the mixture was poured into water and was separated by filtering. The solid residue was soluble in petroleum ether and after several recrystallizations from the petroleum ether a relatively pure product having a melting-point of 113–114° C. was obtained. It is believed that the resultant product was 2 ethyl-5,7,8 trimethyl-6-hydroxy chroman.

The diene constituents for the procedures herein described may be produced from the corresponding alcohol either as a preliminary reaction or in situ in the reaction medium wherein the hydroquinone compound is present. Where produced in situ the hydroquinone ingredient in effect reacts with the alcohol ingredient, the diene intermediate, if produced, being transient. Some evidences indicate that with certain alcohols, at least, the reaction does not include the formation of a diene intermediate, and that the reaction is directly between the hydroquinone compound ingredient and the alcohol ingredient.

The compounds which are adaptable for use in the present invention in the place of the dienes aforementioned are those presenting double bond linkages. Thus any alcohol, such as an allylic alcohol, or any compound which will produce a diene constituent either directly by the use of acid catalysts and/or heat, or after rearrangement in the presence of acids and/or by heating, may be used in this synthesis. Thus for the source of the diene constituent we may use an ene-ol, e. g. an aliphatic alcohol in which at least one double bond is present, such as primary allylic alcohols having the general structure

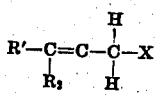

where R' or R² are hydrogen atoms or alkyl radicals, or tertiary allylic alcohols having the general structure

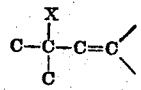

in which X may be either a hydroxyl group or a halogen. Or as the source of the diene constituent we may likewise use a dihydric alcohol or a halide such as the 1,2 diols or 1,2 dihalides having the general structure

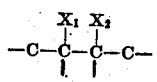

or the 1,3 diols or 1,3 dihalides having the general structure

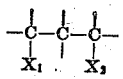

where either $X_1$ or $X_2$ or both may be a hydroxyl group or halogen.

When utilizing the dihalides according to this procedure the selected diene yielding compound is substituted for the diene constituent and the reaction carried out as before in the presence of an acid dehydrating catalyst or by heating in the absence of a catalyst. When utilizing the diols it is preferred to prepare the conjugated diene constituent and utilize the thus prepared diene constituent with the hydroquinone compound in producing the new products of the present invention.

Example VII

A mixture of 1 gram trimethylhydroquinone, 1 cc. allyl alcohol, 0.3 gram anhydrous zinc chloride and 5 cc. benzene was sealed in a Carius tube and heated at 200° C. for 3½ hours. The resultant reaction mixture was shaken with petroleum ether and water, and the ether layer containing the reaction product, separated and allowed to stand for 24 hours. It was then filtered and evaporated to isolate the thick residual oil reaction product. The residual oil crystallized on cooling, and the crystalline residue was dissolved in ethyl ether and purified by steam distillation, the distillate yielding a crystalline solid having a melting point of 124.5–125.5° C., the yield was about 200 mg. The product was recrystallized from petroleum ether and after thus purified had a melting point of 127–128° C. The product is believed to be 2,4,6,7-tetramethyl 5-hydroxy coumaran.

Example VIII

A mixture of 1 gram trimethylhydroquinone, 1 cc. methylvinyl carbinol, 0.3 gram zinc chloride and 5 cc. benzene was sealed in a Carius tube and heated to 200° C. for 3 hours. The product was dissolved out with petroleum ether and the solution was allowed to stand for 24 hours. It was then filtered and evaporated and the residue was crystallized from petroleum ether and then from aqueous ethanol. The thus purified product melted at 119.5 to 120.5° C. and was believed to be 2,3,4,6,7-pentamethyl 5-hydroxy coumaran.

Example IX 2 grams of trimethylhydroquinone, 2 cc. ethylvinyl carbinol, 0.6 gram zinc chloride and 5 cc. benzene was sealed in a Carius tube and heated to 150° C. for one hour and then to 200° C. for one hour. The benzene layer of the reaction mixture was separated, washed with water and then steam distilled. The benzene fraction resulting from the steam distillation was discarded and subsequent aqueous distillates containing the reaction product retained. A solid crystallized out of the aqueous fraction and was filtered off with suction and re-crystallized several times from petroleum ether. The thus purified product had a melting point of 88–89° C. and is believed to be 2,4,6,7-tetramethyl 3 ethyl-5 hydroxy coumaran. The results of this procedure indicate that the particular alcohol used may react directly with the hydroquinone compound without first producing the diene, since if the diene had been produced, the product would have been the same as in Example 6 above.

Example X

A mixture of 2 grams trimethylhydroquinone, 3 cc. geraniol, 0.6 gram zinc chloride and 5 cc. benzene was heated in a Carius tube for one hour at 150° C. and for one hour at 200° C. The resultant reaction mixture was extracted with ethyl ether and the extract washed with water. The ether solution was then filtered and evaporated. The resultant reaction product, which remained in the residue, was dissolved with hot petroleum ether and the petroleum ether was then evaporated off. The partially purified product was then dissolved in methanol and the methanol solution produced catalytically with hydrogen in the presence of platinum oxide catalyst. The alcohol was then distilled off and the resultant partially purified oily reaction product distilled in high vacuum, the vacuum being $1 \times 10^{-6}$ mm. of mercury pressure. The fraction distilled off between 110–115° C. is believed to be a substituted hydroxy chroman.

Example XI

A mixture of 800 cc. of glacial acetic acid, 100 grams zinc chloride, 200 grams trimethylhydroquinone was heated with stirring at 125–130° C. in an atmosphere of nitrogen. Into the hot mixture there was dropped 400 grams of phytol. After three hours of heating, the resultant reaction mixture was poured into a mixture of ice and water and the mass was extracted with ethyl ether. The ether layer was washed with water and dilute potassium hydroxide and dried over sodium sulphate. The ether was then distilled off and the residue further purified by distillation in high vacuum.

The product produced in accordance with the present example is a pale yellow fairly viscous oil and when biologically assayed for its vitamin E activity was found to be 100% active in 3 mg. doses. That is to say, when the product of this example was fed in single 3 mg. doses to standardized conditioned female test rats, litters of live young were produced in 100% of all rats fed, and the activity of the product was equal, weight for weight, to natural alpha tocopherol.

However, the product of the present example is not identical with natural alpha tocopherol since the former is racemic (not-rotatory) about the number two carbon atom, while the latter is rotatory about the same. The new product of this procedure may thus, with reason be known as racemic alpha tocopherol.

The non-identity is also evidenced by the fact that the allophanate derivatives of the product produced by this example and the allophanate derivatives of natural alpha-tocopherol melt at 168–170° C. and 157–160° C. respectively, and the melting point of mixtures of allophanate derivatives is between these melting points.

In the present example the glacial acetic acid, a polar solvent, apparently acts not only as a solvent but also as a catalyst. Other examples of polar solvents suitable for use in the reactions of the present invention are formic acid, propionic acid and the like compounds.

Example XII

A mixture of 5 grams of m-xylo-hydroquinone, 5 cc. allyl alcohol, 10 cc. benzene and 1.5 grams zinc chloride was sealed in a Carius tube and heated for one hour at 150° C. and one hour at 200° C. The resultant reaction mixture was removed and subjected to steam distillation which removed traces of an oily product. The bulk of the product remained and consisted of an oil which was soluble in hot carbon tetrachloride. The oil could be brominated and decolorized potassium permanganate solution, and it is believed consisted primarily of diallylation product probably having the following structure:

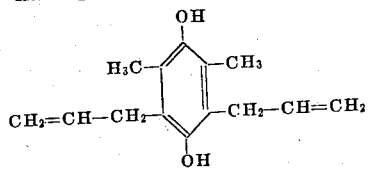

In this and other examples of the present invention the benzene, a non-polar solvent, served as solvent for the reacting ingredients. Other non-polar solvents suitable for use in this invention are toluene, xylene, decalin and the like.

Example XIII

When nerolidol, which is described by Beilstein, vol. I, page 464, and otherwise known as the allylic isomer of tetrahydrofarnesol, having the structure

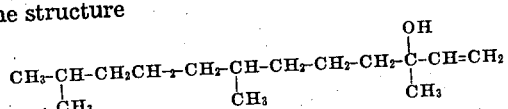

is substituted for the dienes of any of the foregoing examples, it is probably converted into a diene which immediately reacts with the hydroquinone compound to produce a chroman. As an example of this procedure the following is given: Trimethyl hydroquinone (1 g.) and nerolidol (5 g.) are dissolved in a mixture of formic acid (5 g.) and acetic acid (5 g.) and the solution refluxed for three hours. The product (2 g.) is isolated exactly as in Example IV and is a dark, viscous oil.

Example XIV

The product produced in accordance with Example VIII was boiled with an excess of acetic anhydride and the acetate thus produced separated by crystallization in cold water. The acetate had a melting point of 70.5–71° C. and is useful for many purposes, since the ester is not readily oxidized as is the parent substance of Example VIII.

Similar esters may be prepared from any of the products produced in accordance with the procedure herein set forth provided these products contain a free hydroxyl group. Thus the products produced in accordance with Examples VII and XII hereof, and other examples may likewise be esterified. The propionate, butyrate, palmitate, stearate and the like esters may also be prepared from the products hereof and are particularly useful where stability is important.

In the procedures herein described the hydroquinone compound ingredient may if desired be a mono-ether such as the methyl, ethyl, propyl, allyl, cyclohexyl or the like or a mono-ester, such as an acetate, propionate, benzoate, allophanate, palmitate or the like, which ethers or esters have at least one position vacant ortho to a free hydroxy group of the hydroquinone nucleus. The ether or ester grouping remains throughout the reaction and, if desired, is cleaved from the resulting product by any of the well known methods. Thus the ester group may be cleaved by hydrolysis with alkali, for example, as described by Evans et al., Journal of Biological Chemistry, 113, 322 (1936), and the ether group may be cleaved by the use of a Grignard reagent, for example, as described in Chemical Abstracts, vol. 26, pages 5084–5, and vol. 27, pages 276–7 and page 2944. It is to be understood of course, that for some uses, it is desirable to leave the ether or ester grouping in place, while for other uses it is desirably removed.

In each of the foregoing examples the hydroquinone compound used is either a substituted hydroquinone or a derivative of hydroquinone. Thus in Examples I and II the derivative, hydroquinone monomethylether, was used and in Examples III, IV and others of the examples the substituted compounds, trimethylhydroquinone or m-xylohydroquinone, were used. Accordingly where the term "hydroquinone compound" is used in the specification and claims, it is intended to mean alkyl substituted hydroquinones or the hydroquinone ethers and esters such as those herein enumerated.

Certain of the products containing a free hydroxyl group, and made according to the process of the present invention, are active antioxidants and may be used for the purposes for which antioxidants have heretofore been employed, and being structurally identified with the tocopherols, they are useful as such. The term "tocopherols" refers to naturally occurring substances having biological (vitamin E) activity. The term was introduced into the literature in the Journal of Biological Chemistry, volume 113, page 321, 1936.

The present application is a continuation in part of our application Ser. 211,077, filed May 31, 1938, Patent 2,249,054, issued July 15, 1941.

Many and various modifications will suggest themselves to those skilled in the art and it is intended that these may be used in modification of the procedures and products herein set forth without departing from the spirit of the invention described and claimed.

We claim:
1. A process for producing chroman compounds which comprises reacting a gamma-gamma-dialkyl-substituted allylic alcohol having a double bond in the beta-gamma position to the hydroxyl group with an aromatic compound containing a free hydroxyl group and an unsubstituted position ortho to said hydroxyl and selected from the group consisting of alkyl-substituted-para-di-hydroxy benzenes and their mono ethers and mono esters, said reaction being carried out at superatmospheric pressure and in the presence of an acid catalyst.

2. A process for producing chroman compounds which comprises reacting a gamma-gamma dialkyl-substituted allylic alcohol having a double bond in the beta-gamma position to the hydroxyl group with an aromatic compound containing a free hydroxyl group and an unsubstituted position ortho to said hydroxyl and selected from the class consisting of alkyl-substituted-para-di-hydroxy benzenes and their mono ethers and mono esters, said reaction being carried out in the presence of a solvent and in the presence of an acidic catalyst.

3. A process for producing chroman compounds which comprises reacting a gamma-gamma dialkyl-substituted allylic alcohol having a double bond in the beta-gamma position to the hydroxyl group and a mono ester of an alkyl-substituted-para-di-hydroxy benzene having one position vacant ortho to the free hydroxyl group, in the presence of an acidic substance.

4. A process for producing chroman compounds which comprises reacting a gamma-gamma dialkyl-substituted allylic alcohol having a double bond in the beta-gamma position to the hydroxyl group and a mono ester of an alkyl substituted para-di-hydroxy benzene having one position vacant ortho to the free hydroxyl group, in the presence of an acidic substance, and then cleaving the ester group from the reaction product to reintroduce the hydroxyl group.

5. A process for producing chroman compounds which comprises reacting a gamma-gamma dialkyl-substituted allylic alcohol having a double bond in the beta-gamma position to the hydroxyl group and a mono ether of an alkyl substituted para-di-hydroxy benzene having one position vacant ortho to the free hydroxyl group, in the presence of an acidic substance.

6. A process for producing chroman compounds which comprises reacting a gamma-gamma dialkyl-substituted allylic alcohol having a double bond in the beta-gamma position to the hydroxyl group and a mono ether of an alkyl substituted para-di-hydroxy benzene having one position vacant ortho to the free hydroxyl group, in the presence of an acidic substance, and then cleaving the ether group from the reaction product to reintroduce the hydroxyl group.

7. A process for producing chroman compounds comprising reacting a gamma-gamma-di-alkyl substituted allylic alcohol having a double bond in the beta-gamma position to the hydroxyl group, with an aromatic compound containing a free hydroxyl group and an unsubstituted position ortho to said hydroxyl and selected from the group consisting of alkyl-substituted-para-di-hydroxy-benzenes and their mono ethers and mono esters, in the presence of zinc chloride.

8. A process for producing a chromane in which a gamma-gamma dialkyl-substituted allylic alcohol having a double bond in the beta-gamma position to the hydroxyl group is reacted with an aromatic compound containing a free hydroxyl group and an unsubstituted position ortho to said hydroxyl and selected from the group consisting of alkyl-substituted para-dihydroxy-benzenes, under acidic conditions.

LEE IRVIN SMITH.
HERBERT E. UNGNADE.

REFERENCES CITED

The following references are of record in the file of this patent:

FOREIGN PATENTS

| Number | Country | Date |
|---|---|---|
| 374,142 | Germany | 1932 |
| 394,797 | Germany | 1924 |
| 268,099 | Germany | 1913 |
| 279,864 | Germany | 1914 |

OTHER REFERENCES

Hahn et al., "Chem. Abstracts," 23, pages 2705–6. (Patent Office Library.)

"Annalen," 401, pages 50–51. (Patent Office Library.)

"J. Amer. Chem. Soc.," 41, pages 648–65; 42, pages 157–65. (Patent Office Library.)

Karrer, "Helv. Chemica Acta," 21, pages 820–25. (Patent Office Library.)

"Berichte," 58, pages 1950–51. (Patent Office Library.)

Karrer, Helvetica Chemica Acta, vol. 21 (1938), pp. 520 to 525; pub. May 2, 1938; pp. 1234–1240.